United States Patent [19]

Braun

[11] Patent Number: 4,886,991

[45] Date of Patent: Dec. 12, 1989

[54] ASYNCHRONOUS MOTOR FOR SPINNING ELEMENTS

[75] Inventor: Ernst Braun, Biberach, Fed. Rep. of Germany

[73] Assignee: SKF Textilmaschinen-Komponenten GmbH, Stuttgart, Fed. Rep. of Germany

[21] Appl. No.: 763,032

[22] Filed: Aug. 6, 1985

[30] Foreign Application Priority Data

Aug. 11, 1984 [DE] Fed. Rep. of Germany ....... 3429651

[51] Int. Cl.⁴ ............................................ H02K 17/20
[52] U.S. Cl. .................................. 310/212; 310/157; 310/217
[58] Field of Search ............... 310/157, 166, 211, 212, 310/217

[56] References Cited

U.S. PATENT DOCUMENTS

| 2,474,210 | 6/1949 | Abbott | 310/157 X |
| 2,899,618 | 8/1959 | Noodleman | 310/212 X |
| 2,959,694 | 11/1960 | Hutson | 310/212 X |
| 4,103,195 | 7/1978 | Torossian | 310/217 X |

Primary Examiner—Mark O. Budd
Attorney, Agent, or Firm—Bauer & Schaffer

[57] ABSTRACT

A spinning or twisting element is provided with an integral asynchronous motor having a laminate stator and a laminate rotor fixed to the shaft of the element. The individual laminates of the stator and rotor are each less than 0.3 mm in thickness and the stator is provided with at least 24 slots.

1 Claim, 3 Drawing Sheets

ASYNCHRONOUS MOTOR FOR SPINNING ELEMENTS

BACKGROUND OF THE INVENTION

The present invention relates to apparatus for driving the spinning elements of a ring spinning open end spinning machine or the twisting element of a twisting machine, and in particular, to the construction of a motor integral with the element for rotating the element.

The spinning or twisting element currently comprises a spinning twisting spindle or a spinning rotor mounted centrally at the end of a supporting shaft which is itself journaled in spaced bearings and has a drive pulley at its rear end connected by belt means to a motor which drives the element, as well all of the other spinning elements in the system. This kind of drive system works satisfactorily on right spring and twisting machines up to 80,000 mph. At higher speeds which are requested nowadays, the losses in the belt drive system increase to an uneconomic extent. The noise of the machines gets intolerably high.

Some time ago German Patent Publication DE OS-26 44 749 proposed that each individual spinning or twisting element be driven by a single asynchronous motor, the shaft of the spinning or twisting element being the core of the rotor of the motor. In practical use, however, this proposal was doomed from the beginning to failure and has not been adopted, because of the low efficiency, and the long run up time inherent in conventional asynchronous motors and the difficulty in synchronizing the several spinning sites in which said motors are employed.

It is an object of the present invention to provide a spinning or twisting element having an integral asynchronous motor, which overcomes the deficiencies of the prior art and which permits the use of such individual motor drives for the spinning or twisting elements so as to produce the obvious advantages of simplicity, individual control and individual operation of the several elements.

A specific object of the invention is to provide a driving motor for individual spinning or twisting elements having relatively small power (within the range of 20 to 200 watts), at a frequency range of 200 to 2,000 Hz.

It is a further object of the present invention to provide a motor having an optimum efficiency, capable of a quick run up to nominal frequency as well as being capable of fulfilling the requirement of relative synchronization.

The foregoing advantages, together with other advantages and objects will be apparent from the following disclosure of the present invention.

SUMMARY OF THE INVENTION

According to the present invention, a spinning or twisting element is provided with an individual motor drive comprising an asynchronous motor having a laminate stator and a laminate rotor. The individual laminates of the stator and rotor are each less than 0.3 mm in thickness and the stator is provided with at least 24 slots. The shaft of the spinning or twisting element is directly connected to the rotor of the motor.

The motor according to the present invention, by having its stator provided with at least 24 slots, permits a high starting torque, even in the case of a small sized motor. The motor has very little slip resulting in synchronous running of the spinning sites. The use of extremely thin stator laminates, as well as rotor laminates guarantees an optimum degree of efficiency for small motors.

It is preferred to provide the rotor as a double bar armature. As a result, the starting torque of the motor is additionally increased during operation at normal rating. Resistance will be significantly reduced. This helps to prevent motor slip resulting in a particularly good synchronization of the spinning sites, as required by current spinning technology.

Full details of the present invention are set forth in the following disclosure and are illustrated in the accompanying drawings.

DESCRIPTION OF THE INVENTION

Figure 1:
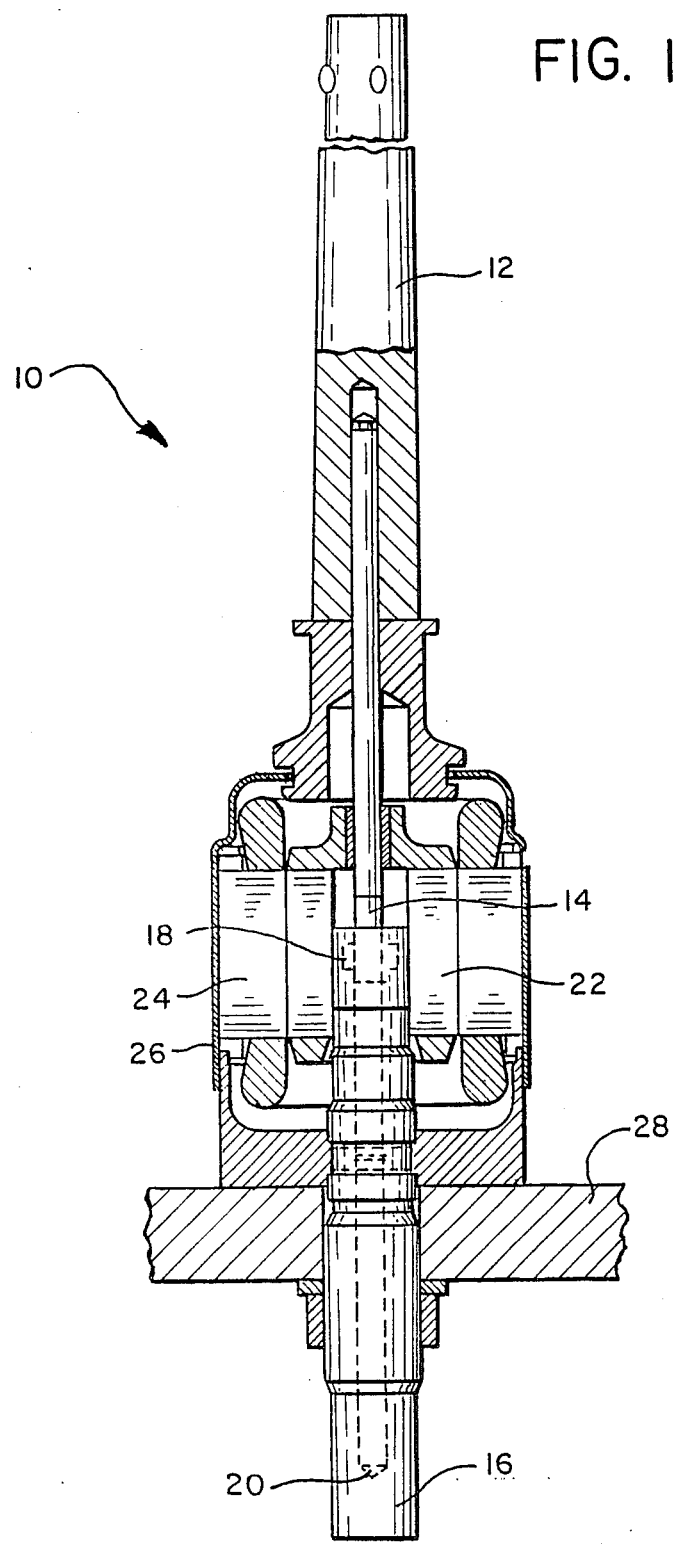
FIG. 1 is a general side view of a ring spinning spindle and integral motor assembly according to the present invention.
Figure 2:
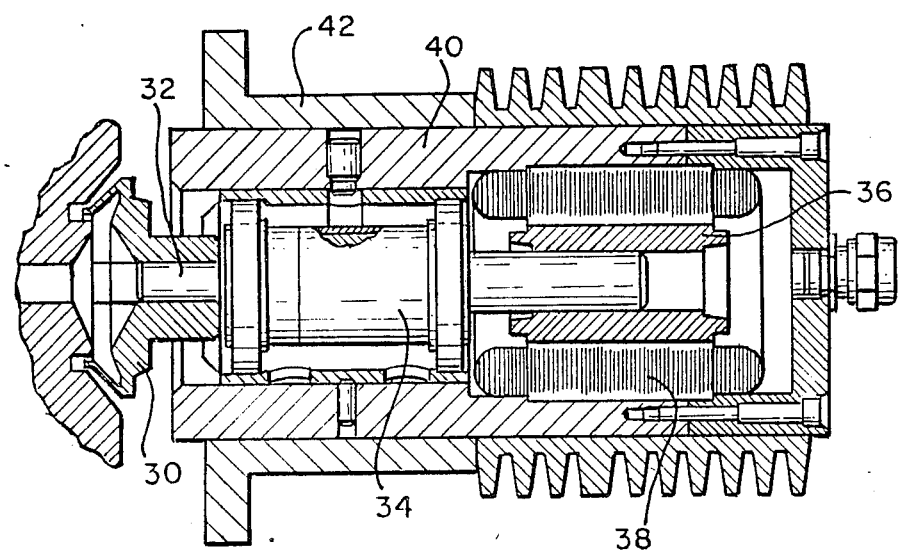
FIG. 2 is a general side view of an open end spinning rotor and integral motor assembly according to the present invention.

The general application of the present invention is illustrated in FIGS. 1 and 2. Here a ring spinning spindle generally depicted by the numeral 10 comprises a plug 12 connected to a blade 14 which is journaled in a bolster 16 with a roller bearing 18 and a footstep bearing 20. The rotor 22 of the asynchronous motor is also connected with the blade 14. The stator 24 is fitted in the housing 26, which is situated on the spindle rail 28. A twisting spindle is similar to this ring spinning spindle.

The open end spinning rotor 30 (FIG. 2) is fitted on the end of the shaft 32 which is journaled in the bearing unit 34. The rear end of the shaft 32 is connected with the rotor 36 of the asynchronous motor. Bearing unit 34 and the stator 38 are fitted in a common housing 40. The complete drive unit is connected with a holding element 42 of the machine.

In this general description, the spinning element and motor assembly is similar to that disclosed in the German Patent Publication DE OS 26 44 749, and for further details, reference to this patent publication can be made. Particularly reference to this publication can be made to the electrical control and power converter for supplying current to the motor. As earlier noted, the present invention is directed to the internal construction of the motor, i.e. the construction of the stator and rotor which details, are set forth herein.

Figure 3:
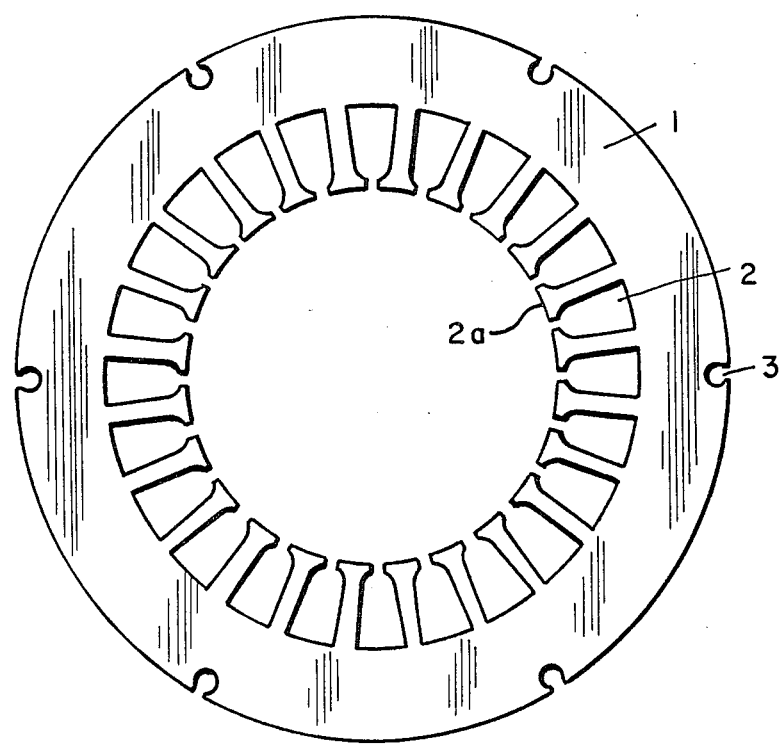
FIG. 3 is a plan view of a stator laminate employed in the motor of FIG. 1 and/or FIG. 2.

The stator 20 is constructed of a plurality of axially superimposed laminates 1, of which one is shown in FIG. 3. Each of the stator laminates 1 are annular disks having a thickness less than 0.3 mm, formed with grooves 2 on their inner circumference and a plurality of rivet holes 3 at their outer circumference. Each of the laminates is covered with a coating of lacquer or other thin layer of insulating material so that it is thoroughly isolated and insulated from the adjacent laminate. A plurality of such laminates, sufficient to form a complete stator, are combined into a bundle, with the slots 2 and rivet holes aligned in the axial direction, and held by means of a rivet (not shown) inserted through each of the aligned rivet holes 3. The aligned slots 2 form a plurality of continous slots through the bundle of laminations into and onto which windings can be drawn in the usual conventional way. The stator laminate is provided with at least 24 slots providing a corresponding minimum number of poles 2a. As a result of the high number of slots and poles, a high torque even for a small sized volume of the stator is provided.

Figure 4:
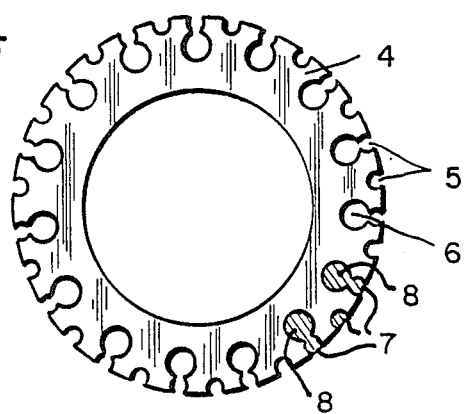
FIG. 4 is a plan view of the rotor laminate employed in the motor of FIG. 1 and/or FIG. 2.

The rotor 18 is itself constructed of a plurality of axially super-imposed and lacquer coated rotor laminates 4 as shown in FIG. 4. The thickness of the rotor laminates, and the form of laminar coating is the same as that for the stator. The rotor laminates are formed with two sets of circular recesses 5 and 6 arranged in two, uniformly spaced concentric rows, there being twice as many smaller recesses 5 as there are larger recesses 6. The larger recesses 6 are in the inner row, radially behind and in communication, (i.e., directly connected) with alternate ones of the smaller recesses 5. The bundle forming the rotor 18 is thus provided with two coaxial rows each having a plurality of slots. The slots are lined with aluminum to form a pair of bar sets 7 and 8 forming a double cage rotor. The externally arranged bars 7 (located in the slots 5) are denominated the "starting" cage, while the internally arranged bars 8 (formed in the slots 6) are denoted the "operational" cage. This arrangement takes into the account the fact that at higher operational frequencies, even with small motors of this type, the current displacement from the operating cage to the starting cage takes full effect, which at normal frequency is unimportant. In this way, the internal operational cage 8 take full effect only during operational speed, thus reducing the slippage of the motor.

By forming the rotor as a double cage rotor, the starting torque is increased, and the individual drive motor of the invention is thus able to run up more quickly. This is especially the case if the motor is directly interconnected to the nominal frequency. The formation of the stator and rotor laminate of such a thin construction (less than 0.3 mm) is particularly advantageous for high frequency motors, as only a few eddy current losses arise during magnetic reversal.

As indicated earlier, the construction of a small high frequency motor as disclosed herein is particularly adapted to existing power systems, such as disclosed in the aforementioned German Patent Publication. The same may be employed with the power source and converter circuit shown in the aforementioned patent without modification thereof. However, unlike the rotor and the motor assembly described in the aforementioned patent, and known in the prior art, the present motor construction is particularly suitable for spinning machines, both to operate the spinning rotor, as well as to operate the twisting mechanism of the type shown in the aforementioned patent. The present invention provides a simple integral motor, inexpensive in both its construction and possible repair and provides the advantages heretofore mentioned.

In addition to the modifications and changes suggested herein, other changes and modifications will be apparent to those skilled in the art. Accordingly, it is intended that the present disclosure be taken as illustrative only, and not limiting the scope of the invention.

What is claimed is:

1. In a spinning or twisting element having a spinning rotor mounted at one end of a drive shaft and an individual asynchronous motor of predetermined size for driving said element at the other end of said shaft, the improvement wherein said motor comprises an annular laminate stator having at least 24 poles and a double bar laminate armature located within said stator and fixed to the other end of said shaft, the thickness of each of the laminates forming each of said stator and armature being less than 0.3 mm to provide an increased number of laminates in said predetermined size.

* * * * *